US009628178B1

(12) United States Patent
Brookins (10) Patent No.: US 9,628,178 B1
(45) Date of Patent: Apr. 18, 2017

(54) EXPANDABLE DOCK CONTROL SYSTEM (71) Applicant: Keith Donald Brookins, Miami, FL (US)

(72) Inventor: Keith Donald Brookins, Miami, FL (US)

(*) Notice: Subject to any disclaimer, the term of this patent is extended or adjusted under 35 U.S.C. 154(b) by 0 days.

(21) Appl. No.: 14/923,529

(22) Filed: Oct. 27, 2015

(51) Int. Cl.
*G08B 5/06* (2006.01)
*H04B 10/116* (2013.01)
*H04B 10/25* (2013.01)
*H04B 10/00* (2013.01)

(52) U.S. Cl.
CPC .............. *H04B 10/116* (2013.01); *G08B 5/06* (2013.01); *H04B 10/22* (2013.01); *H04B 10/25* (2013.01)

(58) Field of Classification Search
CPC ........ H04B 10/00; H04B 10/12; H04B 10/14; H04B 10/22; H04B 10/25; H04B 10/40; H04B 10/116; B60R 2325/304; G08G 3/00; G08G 5/06
See application file for complete search history.

(56) References Cited

U.S. PATENT DOCUMENTS

| | | | | |
|---|---|---|---|---|
| 5,781,147 A * | 7/1998 | Elliott | ..................... | G01S 13/60 342/23 |
| 2008/0310850 A1* | 12/2008 | Pederson | ........... | G07C 9/00158 398/135 |
| 2009/0201152 A1* | 8/2009 | Karr | .......................... | G01S 5/14 340/545.6 |
| 2014/0300470 A1* | 10/2014 | Toncrey | ................... | G07C 3/00 340/539.22 |
| 2015/0092402 A1* | 4/2015 | Waldrop | ................... | F21S 9/02 362/190 |

* cited by examiner

Primary Examiner — Van Trieu
(74) Attorney, Agent, or Firm — Albert Bordas, P.A.

(57) ABSTRACT

An expandable dock monitor and control system having a communicating pile light assembly. The communicating pile light assembly has an electrical system with a controller assembly. The communicating pile light assembly is mounted onto a pile at a dock. The expandable dock monitor and control system further has a gateway/controller system, a local interface device and at least one sentinel. The sentinel has transmitting circuitry to transmit specific event information to a nearest and/or respective communicating pile light assembly, which relays the transmitted specific event information to the gateway/controller system, which deciphers then notices the local interface device. The controller assembly has an RGB and white light controller section, an accelerometer/remote sensor inputs/relay outputs section, a transceiver/digital address tag section and a power supply section. The expandable dock monitor and control system additionally has a remote interface device and a remote access gateway.

19 Claims, 5 Drawing Sheets

EXPANDABLE DOCK CONTROL SYSTEM

BACKGROUND OF THE INVENTION

1. Field of the Invention

The present invention relates to marina operations systems and more particularly, to expandable dock monitor and control systems.

2. Description of the Related Art

Applicant is not aware of any prior art suggesting the novel features of the present invention.

SUMMARY OF THE INVENTION

The present invention is an expandable dock monitor and control operations system. More specifically, the present invention is an expandable dock monitor and control system, comprising a communicating pile light assembly having an electrical system with a controller assembly. The communicating pile light assembly is mounted onto a pile at a dock. The present invention further comprises a gateway/controller system, a local interface device and at least one sentinel. The sentinel comprises transmitting circuitry to transmit specific event information to a nearest and/or respective communicating pile light assembly, which relays the transmitted specific event information to the gateway/controller system, which deciphers then notices the local interface device. The controller assembly comprises an RGB and white light controller section, an accelerometer/remote sensor inputs/relay outputs section, a transceiver/digital address tag section and a power supply section. The present invention may further comprise a remote interface device and a remote access gateway.

The present invention has at least one sentinel or can be any number or combination of sentinels, including but not limited to, a dock trash sentinel, a dock water supply sentinel, a dock pile strike detection sentinel, a vessel high-water detector sentinel, a vessel on fire detector sentinel, a vessel owner panic/emergency alarm detector sentinel, an area security door ajar detector sentinel and/or a locater sentinel.

The dock trash sentinel comprises a sensor, switch and/or a scale with transmitting circuitry to detect and transmit that a trash bin/container is ready for pick up. The dock water supply sentinel comprises a sensor and/or switch to detect that water is flowing in a water line for leak detection. The dock pile strike detection sentinel comprises a motion/vibration or accelerometer sensor and/or switch located on the controller assembly located inside the communicating pile light assembly with transmitting circuitry to transmit that the respective pile was struck and/or hit. The vessel high-water detector sentinel comprises a bilge high-water alarm sensor and/or switch with transmitting circuitry to detect and transmit that a vessel has higher than normal water. The vessel on fire detector sentinel comprises a fire/heat or smoke alarm sensor and/or switch with transmitting circuitry to detect and transmit that a vessel may be on fire. The vessel owner panic/emergency alarm detector sentinel comprises a panic button/switch with transmitting circuitry to transmit notice of a panic/emergency situation. The area security door ajar detector sentinel comprises a sensor and/or switch with transmitting circuitry to notify that a security door or gate is open or ajar. The locater sentinel acts as a tracking device to identify its location by proximity to a respective communicating pile light assembly. Further comprising contacts for a remote area entry enabler having a switch to open a door or other anything requiring a contact closure or opening.

A plurality of communicating pile light assemblies create a grid or net permitting transmitting of specific event information. The at least one sentinel may be hardwired to the communicating pile light assembly through its remote input and/or may operate wirelessly by radio frequency. The communicating pile light assembly comprises a tip cone that mounts upon a base cone assembly that houses the electrical system. The tip cone is threaded for a mast bolt and secures the base cone assembly by compression onto the pile or pile wrap. The electrical system comprises a tip cone light source assembly. Further comprising at least one rib comprising sidewalls and an elongated cavity. The ribs are mounted onto the pile and may have channeled molding.

It is therefore one of the main objects of the present invention to provide an expandable dock monitor and control system that provides marinas and dock owners wireless control of dock pile lighting through a radio frequency net, while monitoring dock and vessel sentinels and allowing control functions.

It is another object of this invention to provide an expandable dock monitor and control system, which is of a durable and reliable construction.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is an expandable dock and marina monitor and control system and is generally referred to with numeral 10. It can be observed that it basically includes gateway/controller system 20, local interface device 30 and communicating pile light assembly 80.

Figure 1:
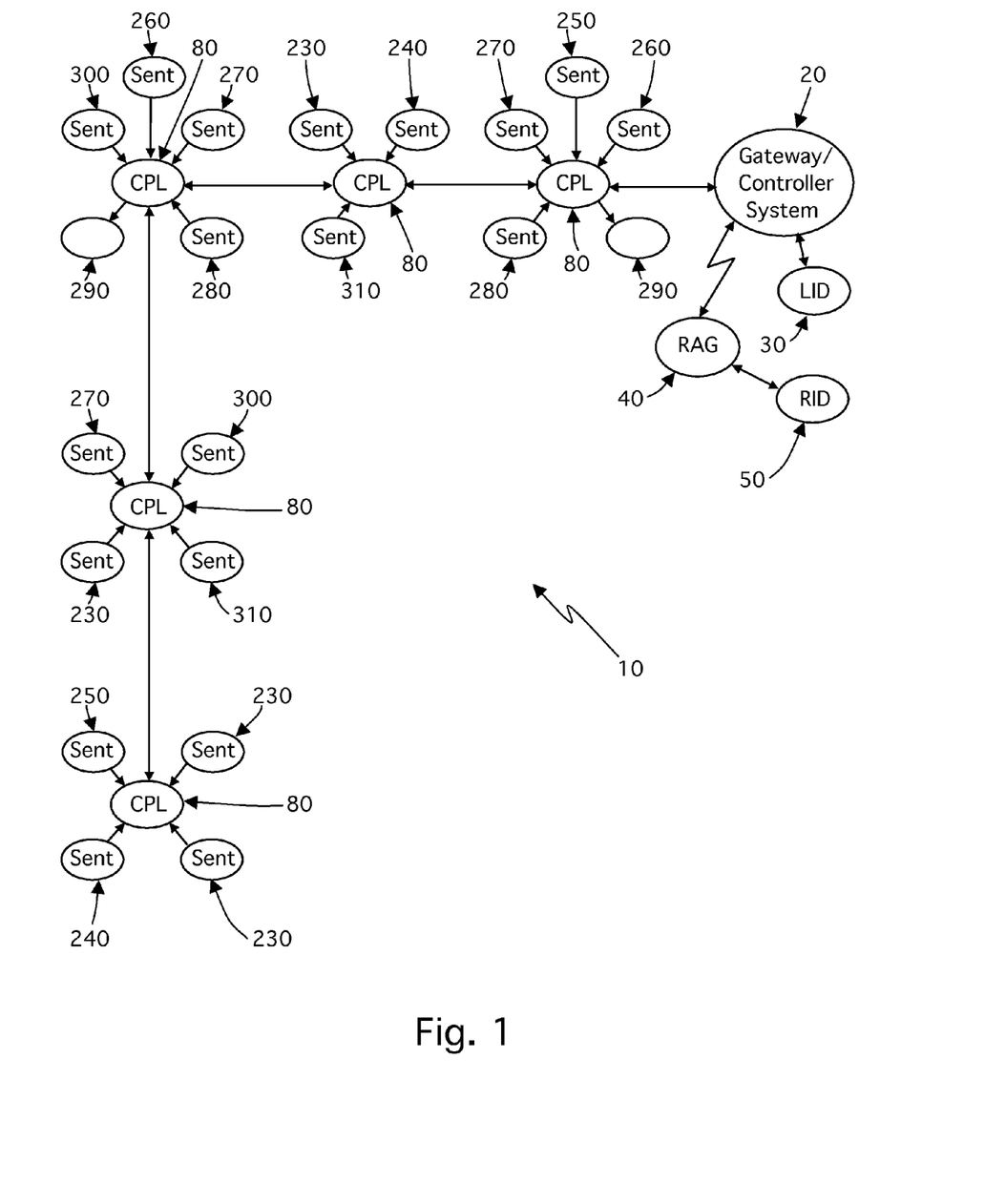
FIG. 1 is an embodiment block diagram of the present invention.
Figure 2:
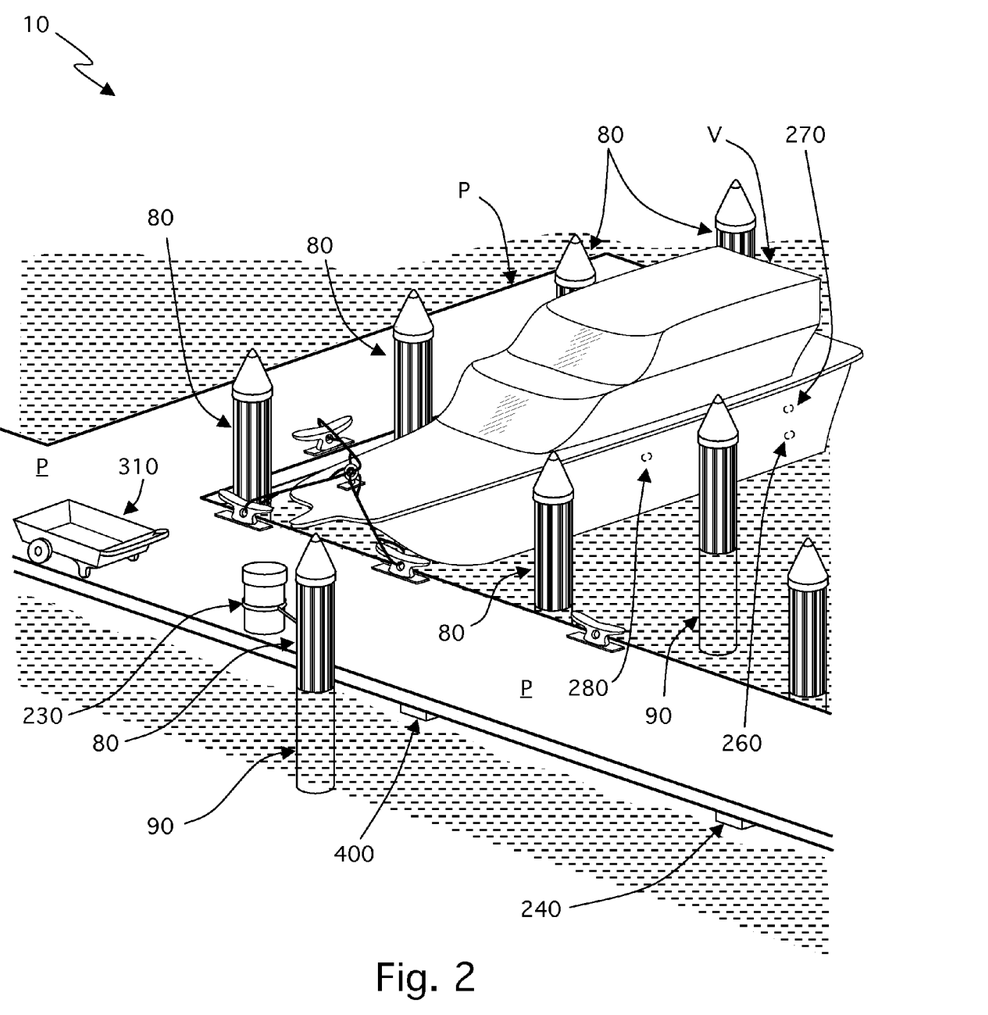
FIG. 2 is an embodiment isometric view of the present invention.

Seen in FIGS. 1 and 2 is at least one embodiment of present invention 10. Present invention 10 comprises at least one communicating pile light assembly 80, gateway/controller system 20 and local interface device 30 and/or remote interface device 50 through remote access gateway 40. Communicating pile light assemblies 80 provide two-way radio frequencies to receive, transmit and/or relay communications with gateway/controller system 20, wherein, more than one communicating pile light assembly 80 creates a grid or net. Communicating pile light assemblies 80 receive, transmit and/or relay specific event information received from sentinels; receive, transmit and/or relay control functions from gateway/controller system 20 and execute commands as they're addressed to their respective location for lighting or axillary control 290, which is an entry enabler.

Gateway/controller system 20 controls communicating pile light assembly's 80 functions as commanded by local interface device 30, remote interface device 50, or program generated responses; executing preprogrammed lighting routines, sequential routines, custom routines, brightness control, selection and identifying individual or specific areas to function separately or differently than others, reactions to sound through an audio input and dimming with an outdoor light sensor input for auto dimming features. Gateway/controller system 20 also translates toolbar commands from local interface device 30 and remote interface device 50. Gateway/controller system 20 also maintains management data relating to running a marina business including billing, pay schedules, payment history, client information, contact lists in case of emergencies, options to have gateway/controller system 20 contact predetermined individuals directly in the event of emergencies, options to contact neighboring vessels V in some events, dock master contacts, dock and/or marina owner contacts, local police and/or fire contact numbers and event histories. Gateway/controller system 20 may be equipped with a microphone system.

Furthermore, gateway/controller system 20 typically supports a management program for large marinas, as well as manages all data and backs to a cloud daily and stores data relating to control and function, interpreting and reacting to events, and system failures.

Gateway/controller system 20 supports local interface device 30 and remote interface device 50. Remote interface device 50 is supported through remote access gateway 40, which allows both remote viewing and control from remote interface device 50 and/or remote downloads and backups. In addition, gateway/controller system 20 stores and sends diagnostic information pertaining to each communicating pile light assembly 80 and present invention 10 in its entirety. Furthermore, gateway/controller system 20 may autonomously download software updates and/or on command.

Figure 5:
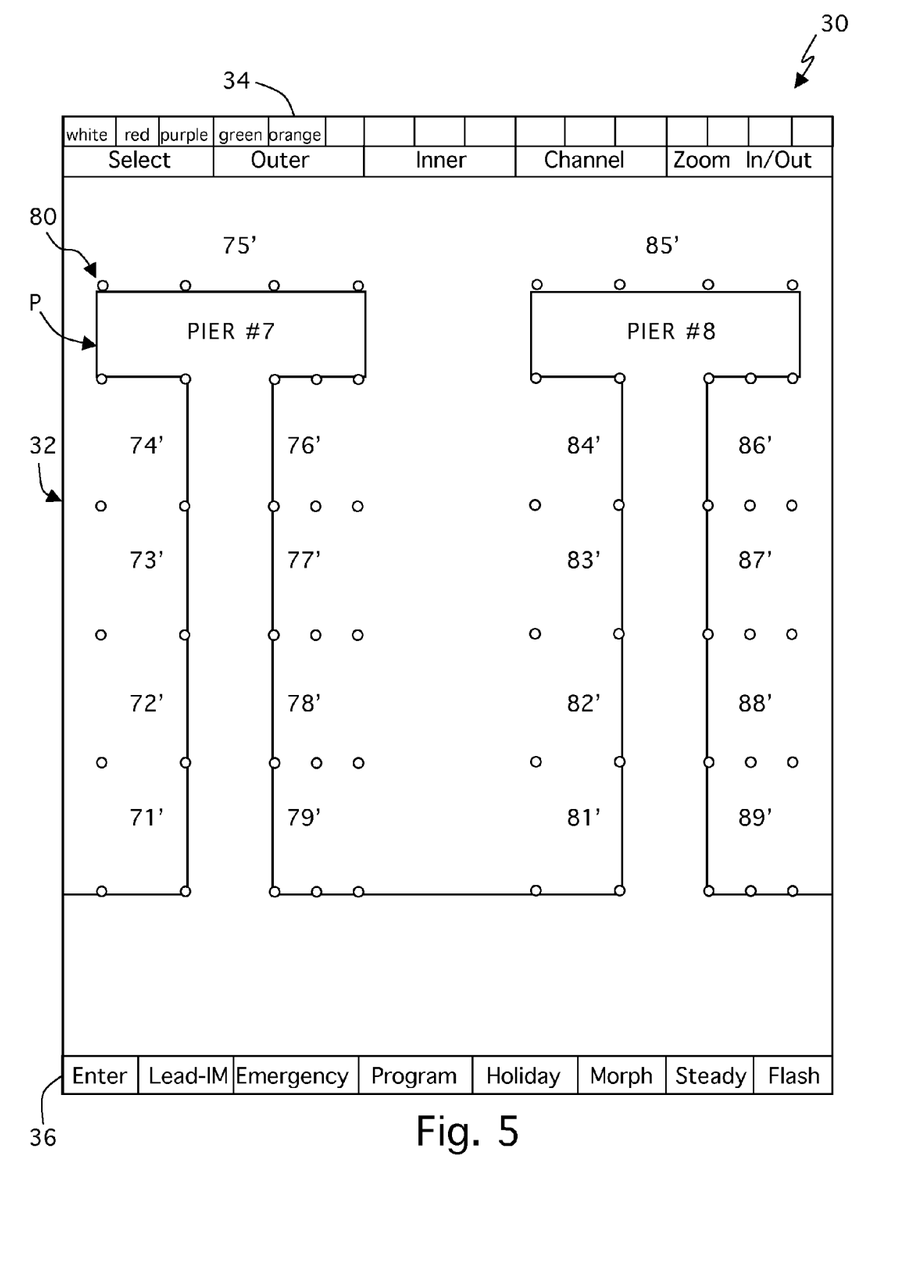
FIG. 5 represents a screenshot of a local interface device of the present invention.

Local interface device 30 comprises monitor 32, seen in FIG. 5, to provide a visual representation of the dock or marina with piers P, displaying current and/or past events. Tool bars 34 and 36, seen in FIG. 5, allow for selecting functional commands for communicating pile light assemblies 80 and axillary functions.

Remote interface device 50 is the same as local interface device 30, except it is remotely located and communicates through remote access gateway 40, whereby remote access gateway 40 allows two-way communication between remote interface device 50 and gateway/controller system 20 by means of Internet or network connection.

Present invention 10 further comprises at least one sentinel that is hardwired to communicating pile light assemblies 80 and/or operate wirelessly by RF. The sentinels, also defined as specific event notification transmitters include, but are not limited to, dock trash sentinel 230 for ready for dock trash collection detection and notification, dock water supply sentinel 240 for open water flow detection and notification, dock pile strike detection sentinel 250 for dock pile strike detection and notification, vessel high-water detector sentinel 260 for vessel higher than normal water detection and notification, vessel on fire detector sentinel 270 for fire detection and notification, vessel owner panic/emergency alarm detector sentinel 280 for vessel owner panic/emergency alarm detection and notification, area security door ajar detector sentinel 300 for security door ajar detection and notification and locater sentinel 310 for cart or other movable items' location detection and notification.

Dock trash sentinel 230 is a specific event notification transmitter and may be hard wired directly to communicating pile light assembly 80 and comprises a sensor, switch and/or a scale with transmitting circuitry as an example to detect and transmit that a trash bin/container is ready for pick up.

Dock water supply sentinel 240 is a specific event notification transmitter and comprises a sensor and/or switch as an example to detect that water is flowing in a water line for leak detection.

Dock pile strike detection sentinel 250 is a specific event notification transmitter and comprises a motion/vibration or accelerometer sensor and/or switch as an example and is located in each communicating pile light assembly 80 to detect and transmit that a respective pile 90 was struck and/or hit.

Vessel high-water detector sentinel 260 is a specific event notification transmitter and comprises a bilge high-water alarm sensor and/or switch with transmitting circuitry as an example to detect and transmit that vessel V has higher than normal water and may be in danger of sinking.

Vessel on fire detector sentinel 270 is a specific event notification transmitter and comprises a fire/heat or smoke alarm sensor and/or switch with transmitting circuitry as an example to detect and transmit that vessel V may be on fire.

Vessel owner panic/emergency alarm detector sentinel 280 is a specific event notification transmitter and comprises a panic button/switch with transmitting circuitry as an example to transmit notice of a panic/emergency situation.

Figure 3:
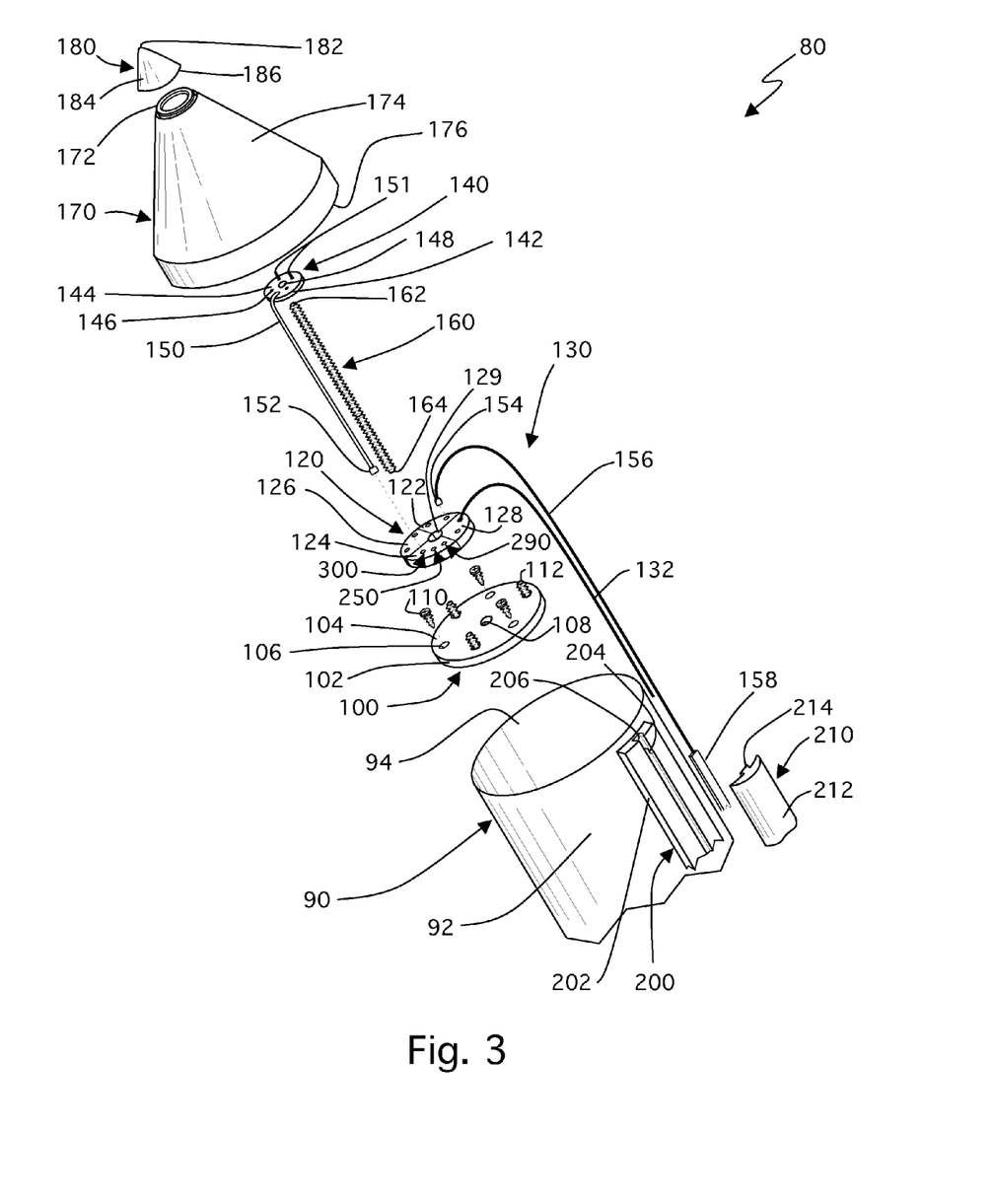
FIG. 3 is a first exploded view of a communicating pile light assembly.

Area security door ajar detector sentinel 300 is a specific event notification transmitter and comprises a sensor and/or switch with transmitting circuitry or can be hardwired to controller assembly 120 comprising accelerometer/remote sensor inputs/relay outputs section 124, seen in FIG. 3, as an example to notify that a security door or gate is open or ajar.

Locater sentinel 310 is a specific event notification transmitter and acts as a tracking device to identify the location of a cart, as an example, by proximity to a respective communicating pile light assembly 80.

In addition, remote area entry enabler 290 comprises a relay no/nc switch to open a door or other anything requiring a contact closure or opening.

A plurality of specific event notification transmitters, comprising any combination of dock trash sentinels 230, dock water supply sentinels 240, dock pile strike detection sentinels 250, seen in FIG. 3, vessel high-water detector sentinels 260, vessel on fire detector sentinels 270, vessel owner panic/emergency alarm detector sentinels 280, area security door ajar detector sentinels 300, seen in FIG. 3, and/or locater sentinels 310 located on and around the dock at piers P, including docked vessels V, will transmit specific event information to a nearest and/or respective communicating pile light assembly 80, which relays the transmitted specific event information to gateway/controller system. 20, which in turn, notices local interface device 30 and/or remote interface device 50 through remote access gateway 40. Gateway/controller system. 20 also controls communicating pile light assemblies 80 through programmed responses, communicating through lighting while also communicating telephonically to inform preprogrammed contacts during a specific event and while simultaneously texting programmed protocol for existing situations to a dock master, vessel owner or otherwise predetermined individuals.

More specifically, communicating pile light assemblies 80 can also comprise address-tagging circuitry. Two or more communicating pile light assemblies 80 within range create a mesh. This mesh operates Zigbee grid. Range can be extended between nodes using a bridge.

Both specific event information and originating communicating pile light assembly 80's location tag are transmitted to gateway/controller system 20 for processing to determine event type and location for programmed responses. Programmed responses include, but are not limited to:

a) Telephonically or text alerting with audio description of the specific event information to all emergency contacts listed for that particular specific event information. For example: dock owner, vessel owner, neighboring vessels, dock master, fire department and police;

b) Visually alerting that particular dock or pier P to a situation by strobing communicating pile light assemblies 80 and identifying the specific area by changing that area's color;

c) Displaying on local interface device 30 and/or remote interface device 50, protocol or directions for that particular specific event information; and d) Recording the specific event information.

All interface devices, including local interface device 30 and remote interface device 50, display, to the end user, an overhead representation of the marina including piers P with statuses on all specific event information visible in real time.

As best seen in FIG. 2, present invention 10 can be installed in a dock and/or marina comprising piers P. A dock or marina is defined as a boat basin offering dockage and facilities for sea vessels V including, but not limited to boats, crafts, houseboat, pleasure boats, skiffs and yachts. Present invention 10 enables autonomous pier P and vessel V monitoring and a communication system for marinas through at least one communicating pile light assembly 80 defining a wireless net. Present invention 10 provides dock and marina owners wireless control of dock pile lighting through its radio frequency net, while monitoring the specific event notification transmitters.

As best seen in FIG. 3, each communicating pile light assembly 80 mounts onto pile 90. Pile 90 comprises sidewall 92 and top wall 94. It is noted that pile 90 may be coated or otherwise wrapped and communicating pile light assembly 80 mounts directly thereon. Each communicating pile light assembly 80 comprises tip cone 180 that mounts upon base cone assembly 170 that houses electrical system 130.

In a preferred embodiment, tip cone 180 is threaded for mast bolt 160 and secures base cone assembly 170 by compression onto pile 90. Tip cone 180 comprises sidewall 184 extending from apex 182 to bottom edge 186. Base cone assembly 170 comprises sidewall 174 extending from top edge 172 to bottom edge 176. Base cone assembly 170 houses mast bolt 160, which extends from tip cone 180 to base plate 100.

Secured by mast bolt 160 is electrical system 130 comprising controller assembly 120 having center hole 129 and tip cone light source assembly 140 having center hole 148.

Controller assembly 120 comprises RGB and white light controller section 122. In a preferred embodiment, controller section 122 controls three zones, being two RGB and one white light. RGB and white light controller section 122 provides power and control to tip cone light source assembly 140 via wires 150 having connector plugs 152. RGB and white light controller section 122 also provides power and control to tape lights 158 via wires 156 having connector plugs 154. Alternate embodiments for tape lights 158 are rope lights, stick lights, eel lights, as an example. RGB and white light controller section 122 effectively splits a lower lighting array by wires 156 into two parts at any ratio. For example, an array can be divided 50/50 to have lights that face a dock in one color, while lights facing outward are another. Another example is an inside corner pile 90 might utilize a 25/75 split. This split serves the system's abilities in several ways as does RGB and white light controller section 122 being dedicated to the particular pile 90 and is wireless and addressable. The lighting array is capable of producing many colors including white. These features coupled with its wireless network make it a powerful visual tool. Further, the lights are bright enough to be seen in mid-day making them functional day and night.

Controller assembly 120 further comprises accelerometer/remote sensor inputs/relay outputs section 124. Accelerometer/remote sensor inputs/relay outputs section 124 is configured to operate with, but not limited to, dock pile strike detection sentinel 250, area security door ajar detector sentinel 300 for security door ajar detection and notification and remote area entry enabler 290, whereby they may be hardwired therein.

Controller assembly 120 further comprises transceiver/digital address tag section 126. Transceiver/digital address tag section 126 comprises electronics to receive and transmit specific event information from the specific event notification transmitters to gateway/controller system 20, which in turn, notices local interface device 30 and/or remote interface device 50 through remote access gateway 40.

Controller assembly 120 further comprises power supply section 128. In a preferred embodiment, power supply section 128 will step down, rectify and regulate low voltage supplied by sealed high to low voltage step down transformer 400, seen in FIG. 2.

Tip cone light source assembly 140 comprises sidewall 142, top wall 144 having holes 146 and center hole 148 to receive mast bolt 160. Light emitting diodes 151 protrude from holes 146. It is understood that light emitting diodes 151 are sufficiently long to extend to and illuminate tip cone 180, whereby tip cone light source assembly 140 is elevated to a desired height by mast bolt 160 threads and further stabilizes base cone assembly 170 by contact at its outermost edges.

Base plate 100 comprises sidewall 102, top wall 104 having mounting holes 106 and center hole 108 that is threaded to receive mast bolt 160. It is noted that mast bolt 160 can be entirely, or partially threaded. Mast bolt 160 has ends 162 and 164. Base plate 100 secures directly onto top wall 94 of pile 90. Mounting hardware includes mounting screws 110 when base plate 100 is used, whereby levelers 112 may be adjusted to level base plate 100. Otherwise mast bolt 160 may thread directly into top wall 94. Extending from controller assembly 120 is power cord 132 that supplies power from sealed high to low voltage step down transformer 400, seen in FIG. 2.

Present invention 10 utilizes low voltage lighting, has no visible mounting hardware, comprises bird-deterrent tip cone 180, has protective lighted ribs and takes very little space from pier P area.

Figure 4:
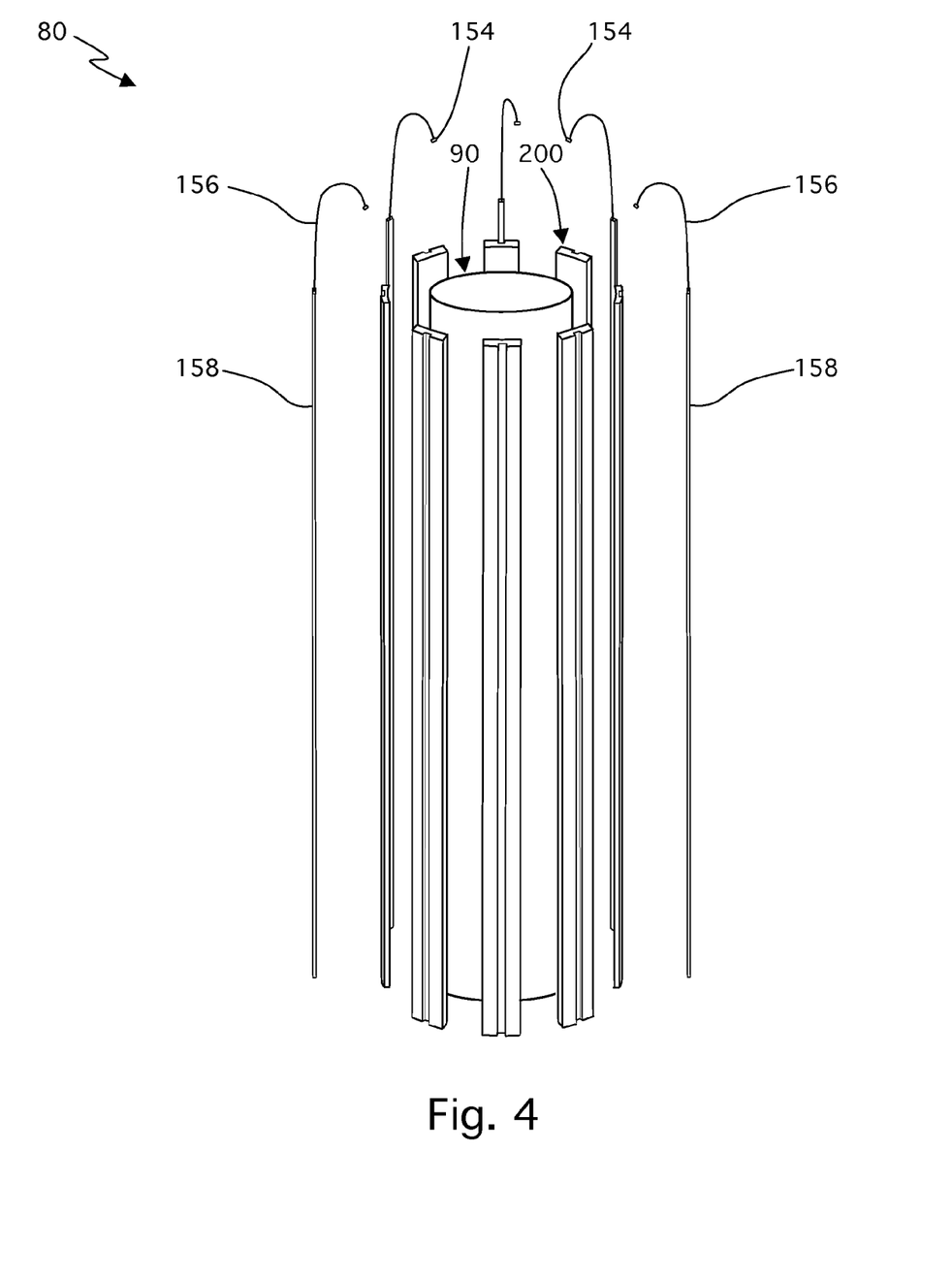
FIG. 4 is a second exploded view of a section of the communicating pile light assembly seen in FIG. 3.

As seen in FIGS. 3 and 4, each rib 200 comprises sidewalls 202 and elongated cavity 204. In a preferred embodiment, ribs 200 are translucent or opaque if desired. Defined within elongated cavity 204 is interior wall 206. Mounting hardware such as screws, not seen, may be secured through interior wall 206 and into sidewall 92 of pile 90. Elongated cavities 204 each receive a respective tape light 158 and/or power cord 132. Channeled molding 210 comprises exterior face 212 and elongated insert 214. In a preferred embodiment, channeled molding 210 is translucent or opaque if desired. Elongated insert 214 is of a cooperative shape and dimension to snugly fit within elongated cavity 204.

As seen in FIG. 5, local interface device 30 provides a visual representation via monitor 32 of the docks with piers P displaying current and/or past events having specific event information. In a preferred embodiment, tool bars 34 and 36 allow the selection of function commands for communicating pile light assemblies 80. More specifically, tool bars 34 and 36 on local interface device 30 (and remote interface device 50), allow a user to control communicating pile light assemblies' 80 functions by a custom selection of color and function in specific locations or run programmed routines. Holiday modes will also be an option. Local interface device 30 and remote interface device 50 allow for inputting new information or updating old information. It provides for inventory and inspection reports. Present invention 10 may work through a computer such as a desktop, smart phone, tablet, wireless smart device, or remote access. The specific event notification transmitters each achieve a specific purpose and two or more may be included in one device. In a marina setting, present invention 10 will have a database and management abilities.

Furthermore, monitor 32 having toolbars 34 and 36 are filled with automated functions. Local interface device's 30 and remote interface device's 50 sense and response program can work autonomously if desired communicating by phone, light animation and texting protocol for each said specific event information.

Present invention 10 utilizes unique controller assembly 120 on each communicating pile light assembly 80 installed upon pile 90. In its quiescent state, present invention 10 provides marinas having docks and/or piers P with unprecedented abilities including, but not limited to:

i. multi-colored lighting and automation of communicating pile light assemblies 80, allowing a specific pier P or slip to become a different color for identification or locating;
  ii. strobing dock lights at communicating pile light assemblies 80 to indicate imminent danger due to weather, fire, panic, etc.;
  iii. strobing a dock area at communicating pile light assemblies 80 to help find it during poor weather of visibility;
  iv. escorting a vessel to their slip using sequential lighting through communicating pile light assemblies 80;
  v. reserving space on a fuel dock for a large vessel by illuminating communicating pile light assemblies 80;
  vi. celebrating or expressing through colors by illuminating communicating pile light assemblies 80;
  vii. becoming turtle friendly seasonably and automatically with communicating pile light assemblies 80;
  viii. identifying a dock from others by turning communicating pile light assemblies 80 by color of choice, especially for newcomers;
  ix. bringing attention to a situation at a specific area by illuminating or color change by communicating pile light assemblies 80 if needed;
  x. sequentially escort or direct pedestrian visitors by illuminating communicating pile light assemblies 80; and
  xi. run spectacular preprogrammed lighting and color routines with communicating pile light assemblies 80.

Additional examples of light function and/or operations by present invention 10:

xii. a captain of vessel V radios the marina that he has an 82' gas-guzzler and is seeking fuel. A marina manager tells the captain to tie up in the "red zone" when he arrives. The marina, knowing they have 130' of fuel dock, turns on the communicating pile light assemblies 80 to red in the area he wants the captain to fuel up, which notifies other would-be fuel seekers to tie off to a non-reserved section allowing for a smother running business;
  xiii. again referring to FIG. 5, a captain of vessel V calls in as a 52' lost-craft needing a slip for a week. A dock master tells him to go to pier #8, slip #85'. The captain asks for directions and the dock master tells him to follow the lead-in lights to the purple slip. The dock master touches monitor 32 at pier #8, slip #85' and it highlights, the dock master then selects toolbar 34 purple and lead-in function at toolbar 36. Now pier #8, slip #85' turns a notably different color for easy identification, simultaneously alerting would-be neighbors while the outside half of piles 90 facing the relevant channel are blinking sequentially, leading the captain to purple pier #8, slip #85'. FIG. 5 illustrates as an example Piers 7 and 8. Pier #7 having slips 71'-79' and Pier #8 having slips 81'-89'.
  xiv. A docked vessel V is unattended and develops a leak or has a bilge pump failure. As a specific event notification transmitter, vessel high-water detector sentinel 260 relays specific event information via a respective communicating pile light assembly 80 to gateway/controller system 20 notifying marina management instantly. Gateway/controller system 20 may be programed to call the owner of the docked vessel V and also contact the neighboring vessels on each side as well. Gateway/controller system 20 may light that slip red as the communicating pile light assemblies 80 of that specific pier P begins to blink in alert mode.
  xv) Communicating pile light assemblies 80 at piers P may be illuminated for different holidays, events and/or causes. As an example, for the 4th of July, communicating pile light assemblies 80 may be illuminated in the colors red, white and blue; on St Patrick's Day, green; on Halloween, orange; on Valentines, red; for Autistic awareness week, blue; for Breast Cancer Awareness, pink, etc.
  xvi) Communicating pile light assemblies 80 at piers P may be illuminated in "turtle friendly" colors during turtle season such as yellows, orange and red; may strobe for weather notifications; or may turn a particular color is rent is due for the slip.

Present invention 10 functions as a multi-zone dock pile 90 lighting system, meaning that each communicating pile light assembly 80 can be divided into independently controlled sections, for example, dock side lit white for lighted pathway while outer face exhibits color/colors while tip cones 180 may flash to indicate imminent danger. All working, communicating through RF, creating a wireless mesh supporting light control, event monitoring and communicating specific event information. Present invention 10 enables early detection, situational awareness and wireless lighting control.

Therefore, present invention 10 is designed to improve the overhead to a marina owner by quickly identifying costly problems and instantly alerting the dock master to the nature and location of a problem. This allows a timely response to such things as fire, sinking, free running water, dock strike damage, medical emergency, panic and safety while an automated program contacts the vessel's owner and vessel neighbors in a combined effort to quickly create an "all-hands-on-deck" reaction that is unique to boating communities.

The dock master benefits by always being informed of such simple creature comforts as knowing where the pier carts, as an example, are located or where the nearest cart is. It reduces the dock master's travels and workload by alerting as to when a trash can needs emptying. If a significant impact is detected, an alert will allow a quick response from the dock master to render assistance if needed or simply assess damages. The short-term benefit is keeping the dock master instantly notified, thus improving productivity and situational awareness. The long term benefit is that by identifying costly problems like damage or free running water, it assures that the cost of repairs can go to a responsible party, or if a leak is found quickly, high costs can be avoided that otherwise would be covered by the marina and ultimately get passed off to the slips' rental fees.

Mariner residents will enjoy the beauty, conveniences, safety and there own sense of security knowing that as long as their vessel is in dock, it's monitored 24-7 for high water and fire by a communication network that links programmed information to practical applications unique and tailored to the needs of this nautical society. Add to that a personal panic-alert, visual navigational assistance and organized well-informed management for possible insurance reductions.

The foregoing description conveys the best understanding of the objectives and advantages of the present invention. Different embodiments may be made of the inventive concept of this invention. It is to be understood that all matter disclosed herein is to be interpreted merely as illustrative and not in a limiting sense.

What is claimed is:

1. An expandable dock monitor and control system, comprising:
    A) a communicating pile light assembly comprising an electrical system having a controller assembly, said communicating pile light assembly is mounted onto a pile at a dock;
    B) a gateway, controller system;
    C) a local interface device; and
    D) at least one sentinel comprising transmitting circuitry to transmit specific event information to a nearest and/or respective said communicating pile light assembly, which relays transmitted said specific event information to said gateway, controller system, which deciphers then notices said local interface device, a plurality of said communicating pile light assembly creates a grid or net permitting transmitting of said specific event information and communications between said plurality of said communicating pile light assembly.

2. The expandable dock monitor and control system set forth in claim 1, further characterized in that said controller assembly comprises a Red, Green and Blue color model and white light controller section.

3. The expandable dock monitor and control system set forth in claim 1, further characterized in that said controller assembly comprises an accelerometer, remote sensor inputs, relay outputs section.

4. The expandable dock monitor and control system set forth in claim 1, further characterized in that said controller assembly comprises a transceiver, digital address tag section.

5. The expandable dock monitor and control system set forth in claim 1, further characterized in that said controller assembly comprises a power supply section.

6. The expandable dock monitor and control system set forth in claim 1, further comprising a remote interface device and a remote access gateway.

7. The expandable dock monitor and control system set forth in claim 1, further characterized in that said at least one sentinel is a dock trash sentinel that comprises a sensor, switch and/or a scale with said transmitting circuitry to detect and transmit that a trash bin container is ready for pick up.

8. The expandable dock monitor and control system set forth in claim 1, further characterized in that said at least one sentinel is a dock water supply sentinel that comprises a sensor and/or switch to detect that water is flowing in a water line for leak detection.

9. The expandable dock monitor and control system set forth in claim 1, further characterized in that said at least one sentinel is a dock pile strike detection sentinel that comprises a motion, vibration or accelerometer sensor and/or switch located in said communicating pile light assembly with said transmitting circuitry to detect and transmit that a respective said pile was struck and/or hit.

10. The expandable dock monitor and control system set forth in claim 1, further characterized in that said at least one sentinel is a vessel high-water detector sentinel that comprises a bilge high-water alarm sensor and/or switch with said transmitting circuitry to detect and transmit that a vessel has higher than normal water.

11. The expandable dock monitor and control system set forth in claim 1, further characterized in that said at least one sentinel is a vessel on fire detector sentinel that comprises a fire, heat or smoke alarm sensor and/or switch with said transmitting circuitry to detect and transmit that a vessel may be on fire.

12. The expandable dock monitor and control system set forth in claim 1, further characterized in that said at least one sentinel is a vessel owner panic, emergency alarm detector sentinel that comprises a panic button or switch with said transmitting circuitry to transmit notice of a panic or emergency situation and location.

13. The expandable dock monitor and control system set forth in claim 1, further characterized in that said at least one sentinel is an area security door ajar detector sentinel that comprises a sensor and/or switch with said transmitting circuitry to notify that a security door or gate is open or ajar.

14. The expandable dock monitor and control system set forth in claim 1, further characterized in that said at least one sentinel is a locater sentinel that acts as a tracking device to identify its location by proximity to a respective said communicating pile light assembly.

15. The expandable dock monitor and control system set forth in claim 1, further comprising a remote area entry enabler comprising a switch to open a door or other anything requiring a contact closure.

16. The expandable dock monitor and control system set forth in claim 1, further characterized in that said at least one sentinel is hardwired to said communicating pile light assembly and/or operates wirelessly by radio frequency.

17. The expandable dock monitor and control system set forth in claim 1, further characterized in that said communicating pile light assembly comprises a tip cone that mounts upon a base cone assembly that houses said electrical system, said tip cone is threaded for a mast bolt and secures said base cone assembly by compression onto said pile.

18. The expandable dock monitor and control system set forth in claim 1, further characterized in that said electrical system comprises a tip cone light source assembly.

19. The expandable dock monitor and control system set forth in claim 1, further comprising at least one rib, each of said at least one rib comprises sidewalls and an elongated cavity, said at least one rib is mounted onto said pile.

* * * * *